United States Patent
Raman et al.

(10) Patent No.: US 11,391,230 B2
(45) Date of Patent: Jul. 19, 2022

(54) COMPRESSION IGNITION ENGINES AND METHODS FOR OPERATING THE SAME UNDER COLD START FAST IDLE CONDITIONS

(71) Applicant: Saudi Arabian Oil Company, Dhahran (SA)

(72) Inventors: Vallinayagam Raman, Dhahran (SA); Yoann Viollet, Dhahran (SA); Junseok Chang, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/676,638

(22) Filed: Nov. 7, 2019

(65) Prior Publication Data
US 2021/0140380 A1    May 13, 2021

(51) Int. Cl.
*F02D 41/06*    (2006.01)
*F02B 1/14*    (2006.01)
(Continued)

(52) U.S. Cl.
CPC .............. *F02D 41/064* (2013.01); *F02B 1/14* (2013.01); *F02D 41/0245* (2013.01);
(Continued)

(58) Field of Classification Search
CPC .............. F02D 41/024; F02D 41/0245; F02D 41/0255; F02D 41/064; F02D 41/402; F02D 2041/389; F02P 5/045
See application file for complete search history.

(56) References Cited

U.S. PATENT DOCUMENTS 5,482,017 A * 1/1996 Brehob ............... F02D 41/0255
123/299
5,642,705 A * 7/1997 Morikawa ............. F02D 41/024
123/300
(Continued)

FOREIGN PATENT DOCUMENTS

AU    2017203240 A1    1/2018
DE    102009002198 A1    10/2010
(Continued)

OTHER PUBLICATIONS

Cedrone et al. "SI engine control in the cold-fast-idle period for low HC emissions and fast catalyst light off" SAE Int. J. Engines 7(2):2014 986-76, 11 pgs.
(Continued)

*Primary Examiner* — John M Zaleskas
(74) *Attorney, Agent, or Firm* — Dinsmore & Shohl LLP (57) ABSTRACT

A method for operating an internal combustion engine includes moving a piston downward from a top dead center position to a bottom dead center position expanding a combustion chamber in an intake stroke, dispensing a first portion of fuel into the combustion chamber, subsequent to moving the piston downward in the intake stroke, moving the piston upward in the vertical direction compressing the combustion chamber in a compression stroke, subsequent to moving the piston upward in the compression stroke, moving the piston downward in the vertical direction in an expansion stroke, while moving the piston downward in the vertical direction in the expansion stroke, dispensing a second portion of fuel into the combustion chamber, and while moving the piston downward in the expansion stroke, igniting at least a part of the first portion of fuel and the second portion of fuel.

4 Claims, 9 Drawing Sheets

(51) Int. Cl.
  *F02D 41/02* (2006.01)
  *F02D 41/40* (2006.01)
  *F02M 61/14* (2006.01)
  *F02P 5/04* (2006.01)
  *F02P 5/15* (2006.01)
  *F02D 41/30* (2006.01)
  *F02D 41/38* (2006.01)

(52) U.S. Cl.
  CPC ..... *F02D 41/0255* (2013.01); *F02D 41/3023* (2013.01); *F02D 41/38* (2013.01); *F02D 41/402* (2013.01); *F02D 41/405* (2013.01); *F02M 61/14* (2013.01); *F02P 5/045* (2013.01); *F02P 5/15* (2013.01); *F02D 2041/389* (2013.01)

(56) References Cited

U.S. PATENT DOCUMENTS

| | | | | |
|---|---|---|---|---|
| 5,713,328 | A * | 2/1998 | Anderson | F02D 33/00 123/299 |
| 5,865,153 | A * | 2/1999 | Matsumoto | F02F 1/4214 123/299 |
| 6,041,591 | A * | 3/2000 | Kaneko | F02D 41/405 60/274 |
| 6,202,601 | B1 * | 3/2001 | Ouellette | F02B 69/04 123/27 GE |
| 6,378,297 | B1 * | 4/2002 | Ito | F02D 41/402 60/284 |
| 6,725,828 | B1 * | 4/2004 | Han | F02B 23/101 123/295 |
| 6,804,952 | B2 | 10/2004 | Sasaki et al. | |
| 6,910,449 | B2 * | 6/2005 | Strom | F02D 35/028 123/90.16 |
| 6,971,365 | B1 * | 12/2005 | Najt | F02D 41/3041 123/305 |
| 6,990,800 | B2 | 1/2006 | van Nieuwstadt et al. | |
| 7,484,498 | B2 * | 2/2009 | Hitomi | F02D 41/3029 123/406.45 |
| 9,382,857 | B2 | 7/2016 | Glugla et al. | |
| 2002/0026924 | A1 * | 3/2002 | Morikawa | F02D 13/0215 123/305 |
| 2005/0161018 | A1 * | 7/2005 | Tomita | F02D 41/405 123/299 |
| 2005/0161020 | A1 * | 7/2005 | Tomita | F02D 37/02 123/305 |
| 2006/0000440 | A1 * | 1/2006 | Kohler | F02D 41/3023 123/295 |
| 2006/0065235 | A1 * | 3/2006 | Tomita | F02D 41/401 123/305 |
| 2006/0185351 | A1 * | 8/2006 | Eves | F02D 41/3029 60/285 |
| 2006/0225693 | A1 * | 10/2006 | Brachert | F02M 26/01 123/255 |
| 2006/0266020 | A1 * | 11/2006 | Okamoto | F02D 37/02 60/284 |
| 2006/0266326 | A1 * | 11/2006 | Yasunaga | F02D 41/402 123/299 |
| 2007/0023006 | A1 * | 2/2007 | Takeda | F02D 37/02 123/305 |
| 2007/0068485 | A1 * | 3/2007 | Hilditch | F02D 41/062 123/299 |
| 2007/0277776 | A1 * | 12/2007 | Thomas | F02D 41/062 123/299 |
| 2007/0295305 | A1 * | 12/2007 | Takahashi | F02D 41/0245 123/406.44 |
| 2008/0140300 | A1 * | 6/2008 | Kuo | F02D 13/0265 701/113 |
| 2008/0196695 | A1 * | 8/2008 | Storhok | F02D 41/401 123/478 |
| 2008/0196696 | A1 * | 8/2008 | Storhok | F02D 41/402 123/491 |
| 2008/0210195 | A1 * | 9/2008 | Saruwatari | F02D 13/0226 123/299 |
| 2008/0269955 | A1 * | 10/2008 | Yasui | H01M 10/48 700/299 |
| 2008/0295798 | A1 * | 12/2008 | Reitz | F02D 41/3836 123/299 |
| 2009/0038583 | A1 * | 2/2009 | Gwidt | F02D 41/0245 123/299 |
| 2009/0151693 | A1 * | 6/2009 | Ono | F02D 41/0002 123/339.11 |
| 2010/0100304 | A1 * | 4/2010 | Yasui | F02D 41/405 701/104 |
| 2010/0175657 | A1 | 7/2010 | Pursifull et al. | |
| 2011/0005496 | A1 * | 1/2011 | Hiraya | F02D 39/08 123/48 B |
| 2012/0216774 | A1 * | 8/2012 | Oba | F02M 63/0225 123/305 |
| 2012/0216775 | A1 * | 8/2012 | Iwai | F02D 41/402 123/305 |
| 2012/0216776 | A1 * | 8/2012 | Nagatsu | F02D 13/0234 123/305 |
| 2014/0360461 | A1 * | 12/2014 | Ulrey | F02M 26/43 123/299 |
| 2016/0115843 | A1 | 4/2016 | Mutsuda et al. | |
| 2016/0290308 | A1 | 10/2016 | Szczepanski | |
| 2016/0369735 | A1 * | 12/2016 | Zhou | F01N 3/101 |
| 2017/0241359 | A1 * | 8/2017 | Hosoya | F02P 5/15 |
| 2018/0010510 | A1 * | 1/2018 | Hayashi | F02P 13/00 |
| 2018/0010511 | A1 * | 1/2018 | Haibara | F02P 15/00 |
| 2018/0010538 | A1 * | 1/2018 | Tsukamoto | F02P 5/1523 |
| 2018/0010540 | A1 * | 1/2018 | Suzuki | F01N 3/101 |
| 2018/0010548 | A1 * | 1/2018 | Hoshi | F02D 41/402 |
| 2018/0010567 | A1 * | 1/2018 | Hirooka | F02D 35/028 |
| 2018/0163687 | A1 * | 6/2018 | Tanaka | F02D 37/02 |
| 2018/0195461 | A1 * | 7/2018 | Hoshi | F02D 41/405 |
| 2018/0291826 | A1 * | 10/2018 | Hoshi | F02B 23/10 |
| 2018/0298832 | A1 * | 10/2018 | Hoshi | F02D 41/3094 |
| 2018/0306135 | A1 * | 10/2018 | Hayashi | F02B 31/00 |
| 2018/0328262 | A1 * | 11/2018 | Iwabuchi | F02P 5/045 |
| 2019/0309695 | A1 * | 10/2019 | Morganti | F02P 5/1502 |
| 2019/0390615 | A1 * | 12/2019 | Viollet | F02D 19/0615 |
| 2020/0072152 | A1 * | 3/2020 | Luo | F02D 41/3094 |

FOREIGN PATENT DOCUMENTS

| | | |
|---|---|---|
| EP | 1602816 A1 | 12/2005 |
| EP | 1728996 A1 | 12/2006 |
| FR | 3064685 A1 | 10/2018 |
| JP | 2011106377 A * | 6/2011 |
| JP | 2019529792 A | 10/2019 |
| WO | 2018221306 A1 | 12/2018 |

OTHER PUBLICATIONS

International Search Report and Written Opinion dated Mar. 2, 2021 pertaining to International application No. PCT/US2020/057843 filed Oct. 29, 2020, 14 pgs.

* cited by examiner

COMPRESSION IGNITION ENGINES AND METHODS FOR OPERATING THE SAME UNDER COLD START FAST IDLE CONDITIONS

BACKGROUND

Field

The present disclosure relates to compression ignition engines and, more particularly, to compression ignition engines and methods for operating compression ignition engines with reduced emissions under cold start fast idle conditions.

Technical Background

Petroleum-based fuels are used to power the vast majority of light-duty transportation vehicles, such as automobiles. For example, gasoline, which is relatively inexpensive and widely available for users, is utilized to power the internal combustion engines of automobiles throughout the world. However, the combustion of petroleum-based fuels may release carbon dioxide into the environment, which may be undesirable for a number of reasons. As other more clean sources of energy for use with transportation vehicles may be too costly and underdeveloped, engines are needed which can operate with petroleum-based fuels with increased efficiency, reduced fuel consumption, or both.

BRIEF SUMMARY

One strategy for improving fuel efficiency includes operating internal combustion engines in a compression ignition mode. The combustion of fuel in a compression ignition mode is generally influenced by compression of a fuel/air mixture, as compared to internal combustion engines operating in a spark ignition mode, in which the combustion of the fuel propagates from a spark. Engines operating in a compression ignition mode may have increased fuel efficiency as compared to conventional spark ignition engines. However, when operating in a compression ignition mode, some emissions may be increased and combustion stability may be decreased, particularly with low temperature combustion when operating under cold start fast idle conditions with fuels having a high resistance to auto-ignition (e.g., fuels with a high research octane number (RON)).

Accordingly, a need exists for improved compression ignition engines and methods for operating compression ignition engines to decrease emissions and increase combustion stability. Embodiments described herein generally relate to ignition and spark timing strategies for operating compression ignition engines with increased exhaust temperature, which may assist in lighting off a catalyst to reduce emission of the compression ignition engine. The ignition and spark timing strategies also increase combustion stability, particularly during cold start fast idle conditions.

In one embodiment, a method for operating an internal combustion engine includes moving a piston downward in a vertical direction from a top dead center position to a bottom dead center position expanding a combustion chamber thereby drawing air into the combustion chamber in an intake stroke, where the combustion chamber is defined at least in part by the piston, a sidewall, and a cylinder head, dispensing a first portion of fuel into the combustion chamber while moving the piston downward in the intake stroke, subsequent to moving the piston downward in the intake stroke, moving the piston upward in the vertical direction compressing the combustion chamber in a compression stroke, subsequent to moving the piston upward in the compression stroke, moving the piston downward in the vertical direction in an expansion stroke, while moving the piston downward in the vertical direction in the expansion stroke, dispensing a second portion of fuel into the combustion chamber, and while moving the piston downward in the expansion stroke, igniting at least a part of the first portion of fuel and the second portion of fuel within the combustion chamber.

In another embodiment, an internal combustion engine system including an internal combustion engine including a cylinder head, a sidewall engaged with the cylinder head, a piston, where the cylinder head, the sidewall, and the piston at least partially define a combustion chamber, and where the piston is movable between a top dead center position and a bottom dead center position to change a volume of the combustion chamber, an intake valve in communication with the combustion chamber, where the intake valve is repositionable between an open position and a closed position, at least one fuel injector in communication with the combustion chamber, an ignition device in communication with the combustion chamber, and an engine control unit communicatively coupled to the intake valve, the at least one fuel injector, and the ignition device, the engine control unit includes a processor and a computer readable and executable instruction set, which when executed, causes the processor to direct the intake valve to move into the open position as the piston moves downward expanding the combustion chamber in an intake stroke, direct the at least one fuel injector to dispense a first portion of fuel into the combustion chamber while the piston moves downward in the intake stroke, subsequent to the intake stroke, direct the intake valve to move into the closed position, direct the at least one fuel injector to dispense a second portion of fuel into the combustion chamber while the piston moves downward in an expansion stroke, and direct the ignition device to light off a spark while the piston moves downward in the expansion stroke.

In another embodiment, an internal combustion engine system including an internal combustion engine including a cylinder head defining a pent-roof defining an angled surface, a sidewall engaged with the cylinder head, a piston, where the cylinder head, the sidewall, and the piston at least partially define a combustion chamber, and where the piston is movable between a top dead center position and a bottom dead center position to change a volume of the combustion chamber, an intake valve in communication with the combustion chamber, where the intake valve is repositionable between an open position and a closed position, at least one fuel injector positioned on the angled surface of the cylinder head and in communication with the combustion chamber, an ignition device in communication with the combustion chamber, and an engine control unit communicatively coupled to the intake valve, the at least one fuel injector, and the ignition device, the engine control unit includes a processor and a computer readable and executable instruction set, which when executed, causes the processor to direct the intake valve to move into the open position as the piston moves downward expanding the combustion chamber in an intake stroke, direct the at least one fuel injector to dispense a first portion of fuel into the combustion chamber while the piston moves downward in the intake stroke, subsequent to the intake stroke, direct the intake valve to move into the closed position, direct the at least one fuel injector to dispense a second portion of fuel into the combustion chamber while the piston moves downward in an expansion stroke, and direct the ignition device to light off a spark while the piston moves downward in the expansion stroke.

In yet another embodiment, a method for operating a compression ignition engine includes performing an initial combustion strategy, the initial combustion strategy including moving a piston downward in a vertical direction from a top dead center position to a bottom dead center position expanding a combustion chamber in an expansion stroke, where the combustion chamber is defined at least in part by the piston, a sidewall, and a cylinder head, rotating a crankshaft coupled to the piston, dispensing an initial portion of fuel into the combustion chamber while moving the piston downward in the expansion stroke, and igniting at least a part of the initial portion of fuel within the combustion chamber while moving the piston downward in the expansion stroke, performing a tertiary combustion strategy subsequent to the initial combustion strategy, the tertiary combustion strategy including moving the piston downward expanding the combustion chamber in an intake stroke, dispensing a first tertiary portion of fuel into the combustion chamber while moving the piston downward in the intake stroke, subsequent to moving the piston downward in the intake stroke, moving the piston upward compressing the combustion chamber in a compression stroke, subsequent to moving the piston upward in the compression stroke, moving the piston downward within the combustion chamber in the vertical direction in the expansion stroke, dispensing a second tertiary portion of fuel into the combustion chamber during one of the intake stroke or the expansion stroke, and igniting at least a part of the first tertiary portion of fuel and the second tertiary portion of fuel within the combustion chamber during the expansion stroke.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments described herein are generally directed to internal combustion engine systems and methods for operating internal combustion engine systems with ignition and spark timing strategies to reduce undesirable emissions and increase combustion stability. In embodiments described herein, a first portion of fuel is dispensed to a combustion chamber in the intake stroke, and a second portion of fuel is dispensed to the combustion chamber in the expansion stroke. During the expansion stroke, an ignition device such as a spark plug lights off a spark to assist igniting the first and second portions of fuel. The split fuel injection and the retarded spark timing generally increases the temperature of exhaust gases from the combustion chamber, which may reduce undesirable emissions by lighting off a catalyst in communication with the combustion chamber. Moreover, the split fuel injection strategy forms a stratified fuel mixture and generally assists in increasing combustion stability in cold start fast idle conditions. These and other embodiments of compression ignition combustion engines are disclosed in greater detail herein with reference to the appended figures.

Figure 1:
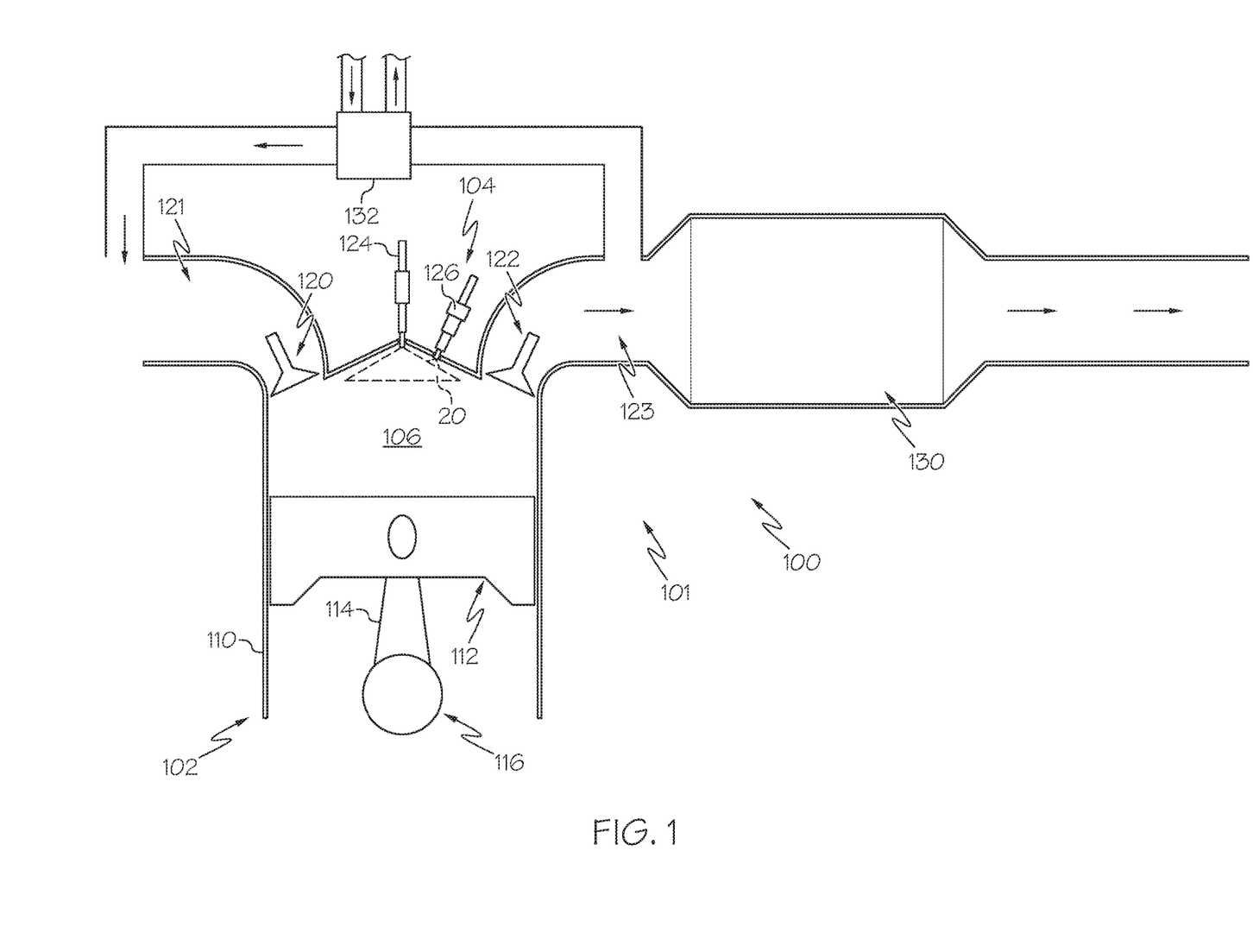
FIG. 1 schematically depicts an internal combustion engine system, according to one or more embodiments shown and described herein.

Now Referring to FIG. 1, an internal combustion engine system 100 is schematically depicted. The internal combustion engine system 100 generally includes an internal combustion engine 101 having a cylinder head 104 engaged with a block 102. The block 102 generally defines one or more sidewalls 110 that are engaged with the cylinder head 104. In embodiments, the internal combustion engine 101 includes a piston 112 positioned at least partially within the one or more sidewalls 110. The piston 112, the cylinder head 104, and the one or more sidewalls 110 at least partially define a combustion chamber 106 in which fuel 20 is combusted. In embodiments, the piston 112 is movable along the one or more sidewalls 110 between a top dead center position and a bottom dead center position, as described in greater detail herein. In some embodiments, the piston 112 may include a bowl geometry or other geometry suitable for compression ignition.

In embodiments, the piston 112 is coupled to a crankshaft 116. For example in the embodiment depicted in FIG. 1, the piston 112 is coupled to the crankshaft 116 through a connecting rod 114. In operation, movement of the piston 112 within the combustion chamber 106 is converted into rotational movement of the crankshaft 116. In embodiments in which the internal combustion engine 101 the engine of a vehicle, rotational movement of the crankshaft 116 may drive one or more wheels of the vehicle to provide the vehicle with mobility.

In embodiments, the internal combustion engine 101 includes an intake valve 120 and an exhaust valve 122. The intake valve 120 and the exhaust valve 122 are each repositionable between an open position and a closed position, and can be moved between the open position and the closed position by any suitable device, such as and without limitation, a cam shaft or the like. Through selective movement of the intake valve 120, the combustion chamber 106 is in selective fluid communication with an engine intake 121. In some embodiments, the engine intake 121 may be an intake manifold or the like through which intake gas (e.g., air) is passed into the combustion chamber 106. Through selective movement of the exhaust valve 122, the combustion chamber 106 is in selective communication with an engine exhaust 123. In some embodiments, the engine exhaust 123 may be an exhaust manifold or the like through which exhaust (e.g., combustion by-products from the combustion chamber 106) are passed after fuel 20 is combusted within the combustion chamber 106. While in the embodiment depicted in FIG. 1, the internal combustion engine 101 includes a single intake valve 120 and a single exhaust valve 122 in communication with the combustion chamber 106, it should be understood that this is merely an example and embodiments described herein may include any suitable number of intake valves and exhaust valves in communication with the combustion chamber 106.

In some embodiments, the internal combustion engine system 100 includes a turbocharger 132 in communication with the engine exhaust 123 and the engine intake 121. Exhaust gases from the engine exhaust 123 may rotate a turbine which compresses air that can then be provided to the engine intake 121. In this way, the turbocharger 132 may increase the pressure of air provided to the engine intake 121 and the combustion chamber 106. While in the embodiment depicted in FIG. 1 the internal combustion engine system 100 is depicted as including a turbocharger 132, it should be understood that the internal combustion engine system 100 may additionally or alternatively include a supercharger or the like to provide compressed air to the engine intake 121. While embodiments of the internal combustion engine system 100 are described as including the turbocharger 132 and/or a supercharger, it should be understood that this is merely an example, and in embodiments, air at ambient pressure may be provided to the engine intake 121.

In embodiments, a catalyst 130 is in communication with the engine exhaust 123, such that exhaust gases from the combustion chamber 106 pass through the catalyst 130. The catalyst 130 may include a suitable oxidation catalyst to reduce hydrocarbon and carbon monoxide emissions of the internal combustion engine system 100. Example catalysts may include, for example and without limitation, catalysts including platinum, palladium, alumina, zeolite, or the like and combinations thereof.

As noted above, the catalyst 130 generally acts to reduce the amount of pollutants in exhaust gases passing through the engine exhaust 123 before the exhaust gases are released from the internal combustion engine system 100 (e.g., before the exhaust gases are released to the atmosphere). Without being bound by theory, the efficacy of catalysts in reducing pollutants in the exhaust gas is dependent on several factors, including but not limited to the temperature of the exhaust gas. In particular, the catalyst 130 defines a "light-off" temperature that corresponds to a minimum temperature at which a desired amount of pollutants (e.g., carbon monoxide and/or hydrocarbons) are converted. In some embodiments, the minimum light-off temperature of the catalyst 130 is about 175 degrees Celsius. In some embodiments, the minimum light-off temperature of the catalyst 130 is about 200 degrees Celsius. In some embodiments, the minimum light-off temperature of the catalyst 130 is about 275 degrees Celsius.

In embodiments, the internal combustion engine system 100 includes a fuel injector 124 and an ignition device 126 in communication with the combustion chamber 106. The fuel injector 124 generally passes fuel 20, such as gasoline or the like, into the combustion chamber 106. In embodiments, the fuel injector 124 may include a multi-hole injector, a hollow cone injector, a piezo or solenoid-driven fuel injector, or the like. The ignition device 126 may include a spark plug or the like that is operable to assist in igniting fuel within the combustion chamber 106. While embodiments described herein generally relate to internal combustion engine systems 100 that operate by compression ignition (e.g., ignition resulting from the compression of an air/fuel mixture), the ignition device 126 may be utilized to assist in inducing ignition under some operating conditions.

Figure 2:
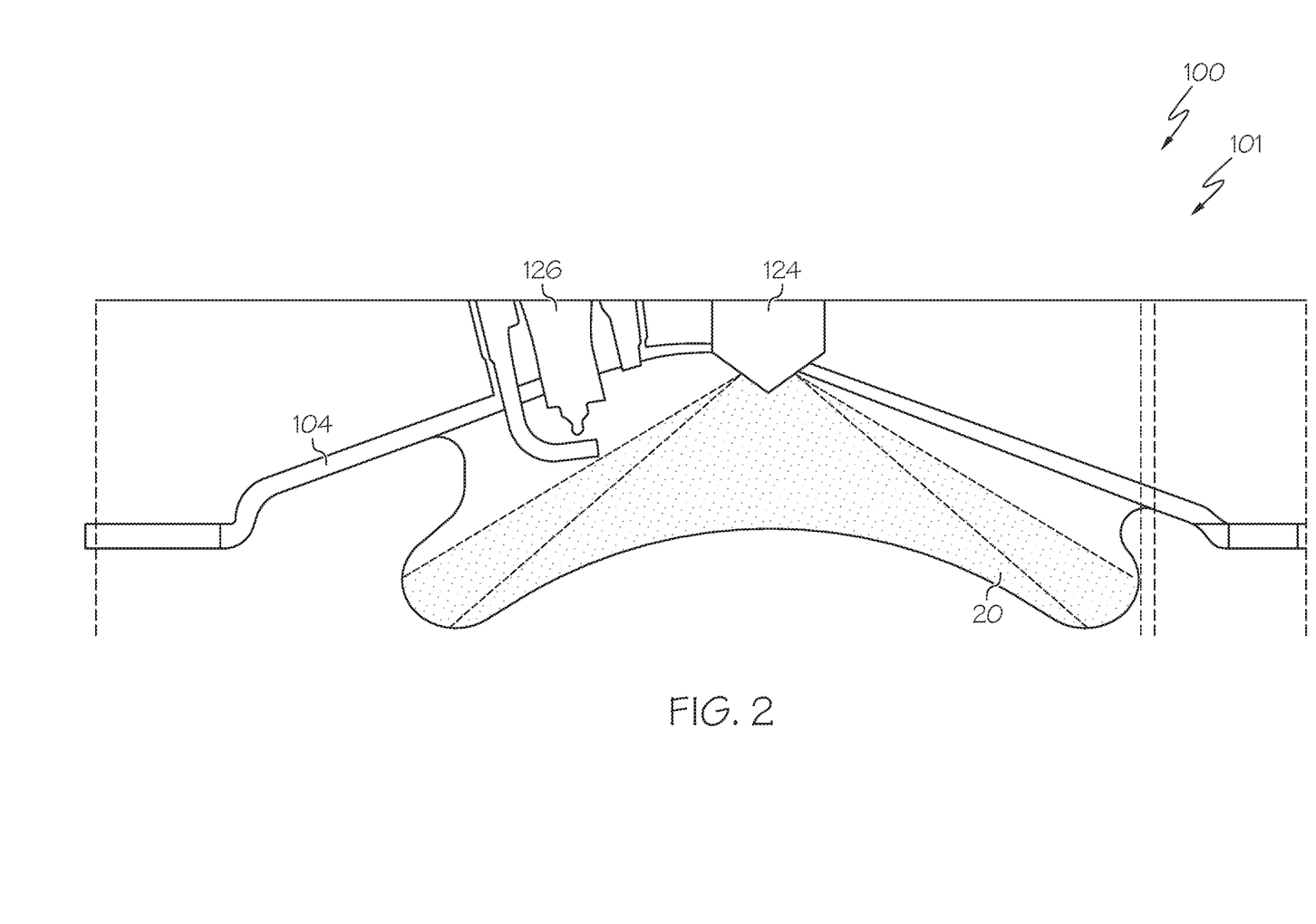
FIG. 2 schematically depicts an enlarged view of a fuel injector and a spark plug of the internal combustion engine system of FIG. 1, according to one or more embodiments shown and described herein.

Referring to FIG. 2, an enlarged view of the fuel injector 124 and the ignition device 126 are schematically depicted. In embodiments, the cylinder head 104 defines a "pent-roof" configuration, forming an angled surface at the top of the combustion chamber 106. In embodiments, the fuel injector 124 is centrally located at the top of the combustion chamber 106, and the ignition device 126 is positioned proximate to the fuel injector 124. In embodiments, the ignition device 126 is positioned on the angled surface of the cylinder head 104. While in the embodiment depicted in FIG. 2, the cylinder head 104 defines the pent-roof configuration, in some embodiments the cylinder head 104 may define outer suitable geometries, such as a flat or generally flat roof.

In operation, the fuel injector 124 dispenses a plume of fuel 20 into the combustion chamber 106. In embodiments described herein, the fuel 20 generally includes a fuel with a comparatively high research octane number (RON). For example, in some embodiments the fuel 20 includes a fuel with a RON greater than 90. In some embodiments, the fuel 20 may include fuels blended with light distillates. For example, in some embodiments, the fuel 20 includes a fuel having a RON greater than 60 that is blended with one or more light distillates.

Figure 3A:
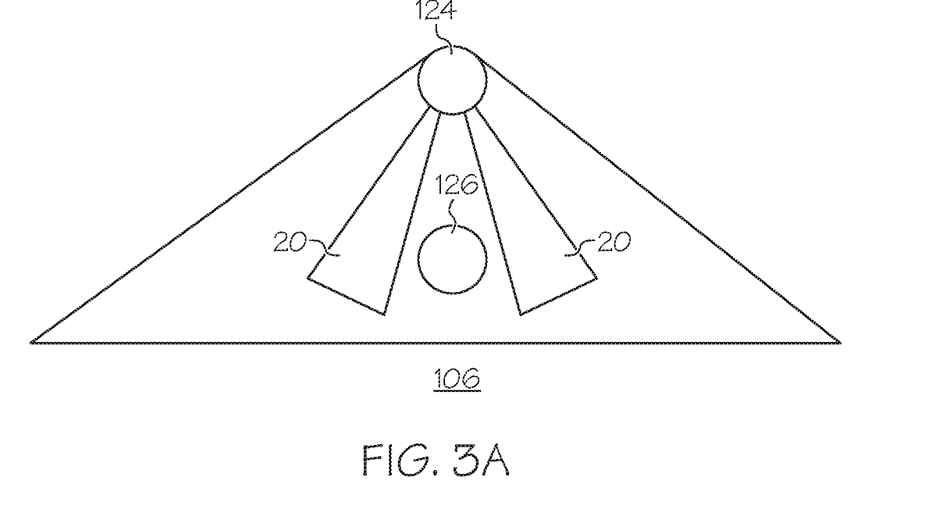
FIG. 3A schematically depicts a schematic diagram of the fuel injector and the spark plug of FIG. 2, according to one or more embodiments shown and described herein.

Referring to FIG. 3A, another side view of the fuel injector 124 and the ignition device 126 are schematically depicted. In some embodiments and as shown in FIG. 3A, the fuel injector 124 may generally dispense the fuel 20 in a "split" plume such that the ignition device 126 is positioned between the split plumes of fuel 20.

Figure 3B:
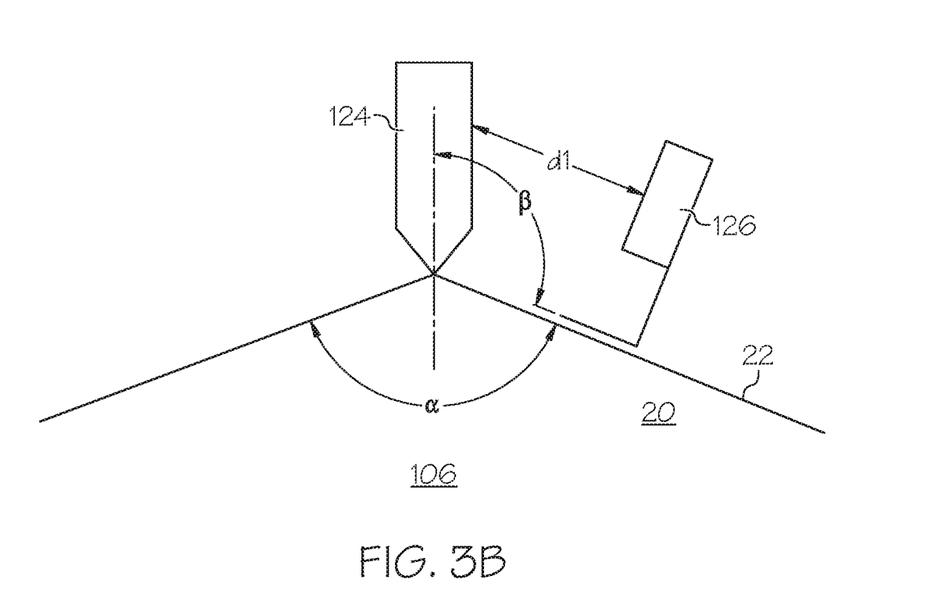
FIG. 3B schematically depicts another schematic diagram of the fuel injector and the spark plug of FIG. 2, according to one or more embodiments shown and described herein.

Referring to FIG. 3B, another view of the fuel injector 124 and the ignition device 126 are schematically depicted. In some embodiments, the fuel injector 124 is centrally positioned over the combustion chamber 106 and defines a spray envelope 22 along which the fuel 20 is dispensed. An electrode of the ignition device 126 is generally positioned above the spray envelope 22, in embodiments. In some embodiments, the fuel injector 124 dispenses the fuel 20 such that the spray envelope 22 defines a spray angle α. The spray angle α, in some embodiments, is between 90 degrees and 130 degrees, inclusive of the endpoints. In embodiments, the spray angle α may be selected to accommodate the geometry of the cylinder head 104 to allow for desirable vaporization of the fuel 20.

In some embodiments, the ignition device 126 is positioned at an ignition device angle β with respect to the fuel injector 124, for example, as a result of the "pent-roof" configuration of the cylinder head 104 (FIG. 2). In some embodiments, the ignition device angle β is between 0 degrees and 22 degrees, inclusive of the endpoints. In embodiments, the ignition device 126 is spaced apart from the fuel injector 124 by a distance d1. In some embodiments, the distance d1 is at least 15 millimeters. In some embodiments, the distance d1 is between 15 millimeters and 20 millimeters, inclusive of the endpoints. Without being bound by theory, the distance d1 between the ignition device 126 and the fuel injector 124, the ignition device angle β, and the position of the ignition device 126 above the spray envelope 22 allows the fuel 20 to vaporize and be mixed with air to form a suitable air/fuel mixture. For example, the positioning of the fuel injector 124 proximate to the ignition device 126 allows the fuel injector 124 to form a stratified fuel mixture that assists with combustion stability even at retarded spark timing, as described in greater detail herein.

Figure 4:
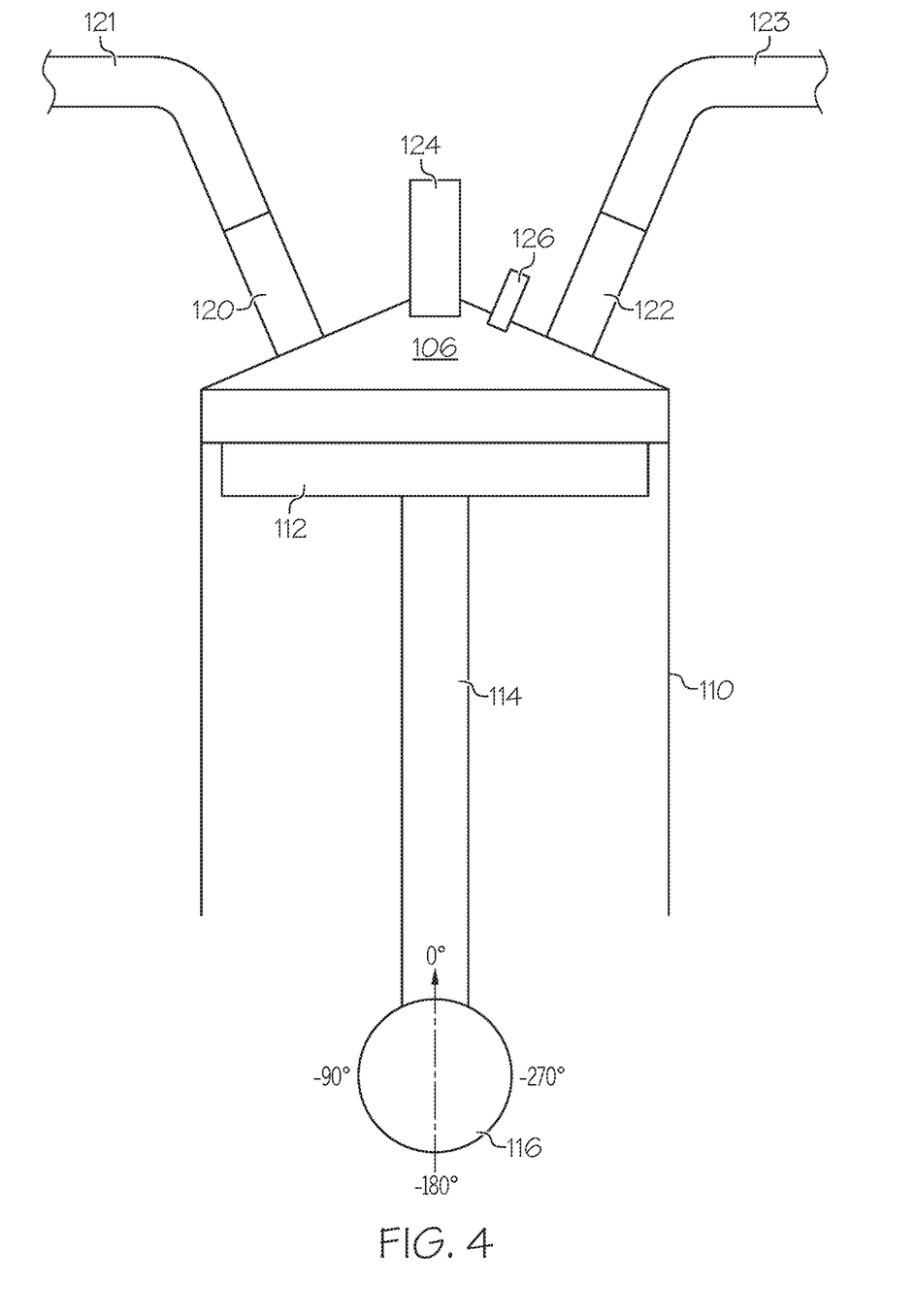
FIG. 4 schematically depicts a cross-sectional view of a combustion chamber of the internal combustion engine system of FIG. 1 with the piston at a top dead center position, according to one or more embodiments described herein.

Referring to FIG. 4, a section view of the combustion chamber 106 of the internal combustion engine 101 is schematically depicted, with the piston 112 positioned at a top dead center position (i.e., with the piston 112 at the top of its stroke within the one or more sidewalls 110). With the piston 112 positioned at the top dead center position, the crankshaft 116 is positioned at a top dead center rotational position (depicted as 0 degrees).

Figure 5:
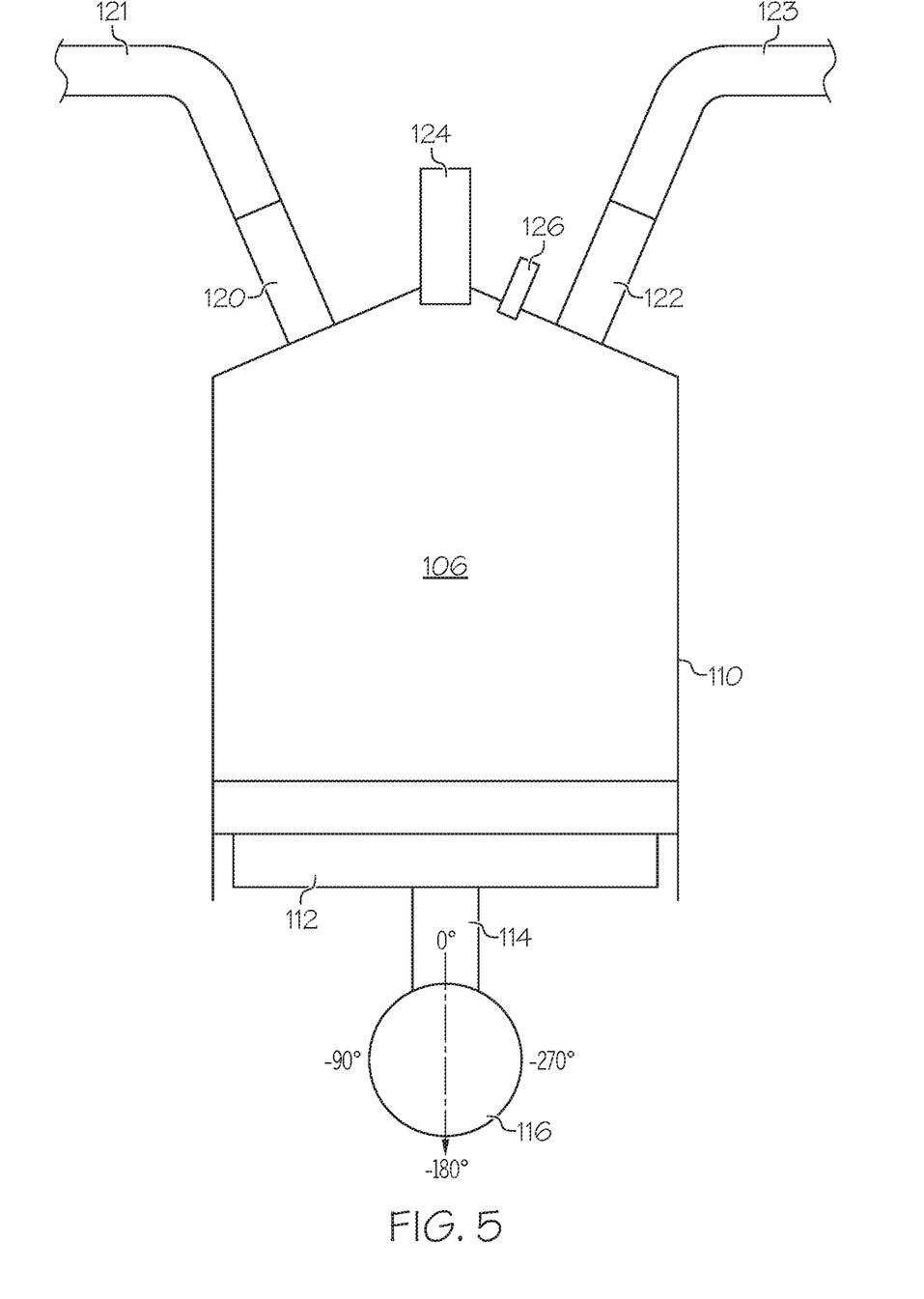
FIG. 5 schematically depicts a cross-sectional view of the combustion chamber of the internal combustion engine system of FIG. 1 with the piston at a bottom dead center position, according to one or more embodiments described herein.
Figure 6:
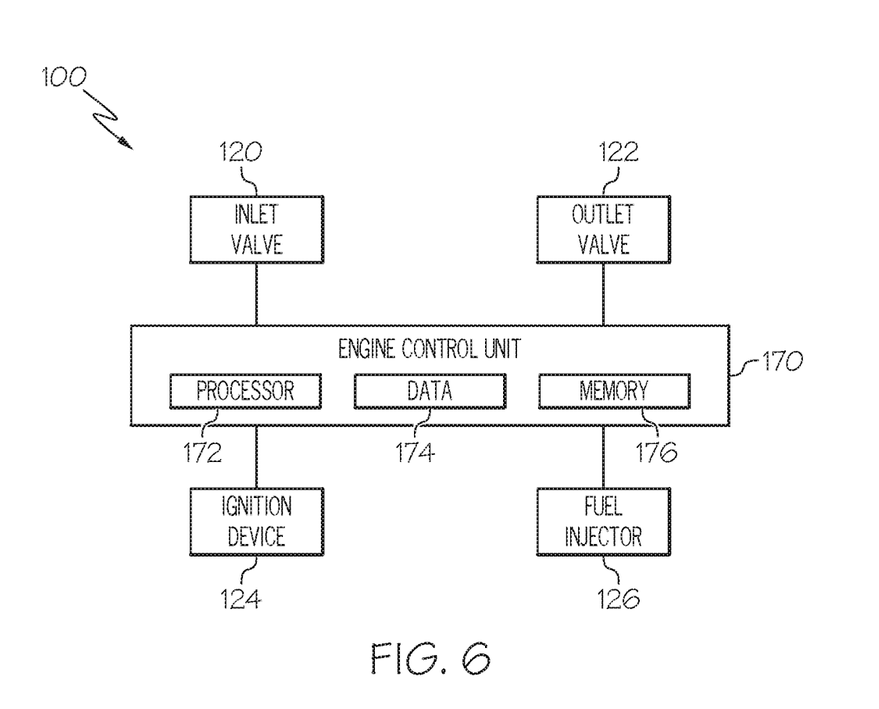
FIG. 6 schematically depicts an engine control unit of the internal combustion engine system of FIG. 1, according to one or more embodiments described herein.

In operation, as the piston 112 moves down along the one or more sidewalls 110, the piston 112 moves between the top dead center position (FIG. 5), and a bottom dead center position, as depicted in FIG. 6. At the bottom dead center position, the piston 112 is at the bottom of its stroke within the one or more sidewalls 110. With the piston 112 positioned at the bottom dead center position, the crankshaft 116 is positioned at a bottom dead center rotational position (depicted as −180 degrees). The piston 112 moves from the top dead center position (FIG. 4) to the bottom dead center position (FIG. 5) in an intake stroke as well as in an expansion stroke, and moves from the bottom dead center position (FIG. 5) back to the top dead center position (FIG. 4) in a compression stroke as well as an exhaust stroke, as described in greater detail herein. During the intake stroke and the expansion stroke, a volume of the combustion chamber 106 increases as the piston 112 moves downward, and during the compression stroke and the exhaust stroke, the volume of the combustion chamber 106 decreases as the piston 112 moves upward. In embodiments, the internal combustion engine 101 defines a compression ratio (e.g., a ratio of the maximum volume of the combustion chamber 106 as shown in FIG. 5 and the minimum volume of the combustion chamber 106 as shown in FIG. 6) that is greater than 14. In some embodiments, the internal combustion engine 101 defines a compression ratio that is between 14 and 18, inclusive of the endpoints. In some embodiments, the internal combustion engine 101 defines a compression ratio that is between 14 and 20, inclusive of the endpoints.

Referring to FIG. 6, in embodiments, the internal combustion engine system 100 includes an engine control unit 170. As illustrated, the engine control unit 170 includes a processor 172, a data storage component 174, and/or a memory component 176. The memory component 176 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the engine control unit 170 and/or external to the engine control unit 170.

The memory component 176 may store operating logic, analysis logic, and communication logic in the form of one or more computer readable and executable instruction sets. The analysis logic and the communication logic may each include a plurality of different pieces of logic, each of which may be embodied as a computer program, firmware, and/or hardware, as an example. A local interface is also included in the engine control unit 170, and may be implemented as a bus or other communication interface to facilitate communication among the components of the engine control unit 170.

The processor 172 may include any processing component operable to receive and execute instructions (such as from a data storage component 174 and/or the memory component 176). It should be understood that while the components in FIG. 6 are illustrated as residing within the engine control unit 170, this is merely an example, and in some embodiments, one or more of the components may reside external to the engine control unit 170. It should also be understood that, while the engine control unit 170 is illustrated as a single device, this is also merely an example.

In embodiments, the engine control unit 170 is communicatively coupled to one or more components of the internal combustion engine system 100. For example, in the embodiment depicted in FIG. 6, the engine control unit 170 is communicatively coupled to the intake valve 120, the exhaust valve 122, the ignition device 126, and the fuel injector 124. In embodiments, the engine control unit 170 selectively directs the intake valve 120 and the exhaust valve 122 to move between their open positions and their closed positions, respectively. The engine control unit 170 also selectively directs the ignition device 126 to light off a spark, and selectively directs the fuel injector 124 to dispense fuel 20 (FIG. 2) into the combustion chamber 106.

For example and referring collectively to FIGS. 4, 5, and 6, in embodiments, the engine control unit 170 directs the intake valve 120 to move into the open position as the piston 112 moves downward, expanding the combustion chamber 106 in an intake stroke (e.g., moving between the top dead center position depicted in FIG. 4 and the bottom dead center position depicted in FIG. 5). As noted above, the intake valve 120 provides selective communication between the engine intake 121 and the combustion chamber 106, and accordingly, as the piston 112 moves downward, air is drawn from the engine intake 121, through the intake valve 120, into the combustion chamber 106.

The piston 112 then moves upward, compressing the combustion chamber 106 in a compression stroke, moving from the bottom dead center position depicted in FIG. 5 back to the top dead center position depicted in FIG. 4. During or before the compression stroke, the engine control unit 170 directs the intake valve 120 to move from the open position to the closed position, such that the intake valve 120 and the exhaust valve 122 are both in the closed position as the piston 112 moves upward in the compression stroke.

Subsequent to moving the piston 112 upward in the compression stroke, the piston 112 moves downward in the vertical direction in an expansion stroke, moving from the top dead center position (FIG. 4) back to the bottom dead center position (FIG. 5). Subsequent to moving the piston 112 downward in the expansion stroke, the piston 112 moves upward in an exhaust stroke from the bottom dead center position (FIG. 5) to the top dead center position (FIG. 4). Before or as the piston 112 moves upward in the exhaust stroke, the engine control unit 170 directs the exhaust valve 122 to move from the closed position to the open position, such that as the piston 112 moves upward, exhaust gases from the combustion chamber 106 are expelled from the combustion chamber 106 to the engine exhaust 123.

In embodiments, the engine control unit 170 directs the fuel injector 124 to dispense fuel 20 into the combustion chamber 106. For example, in some embodiments, the engine control unit 170 directs the fuel injector 124 to dispense fuel 20 (FIG. 1) into the combustion chamber 106 and directs the ignition device 126 to initiate a spark at particular points as the piston 112 cycles between the top dead center position and the bottom dead center position.

Figure 7:
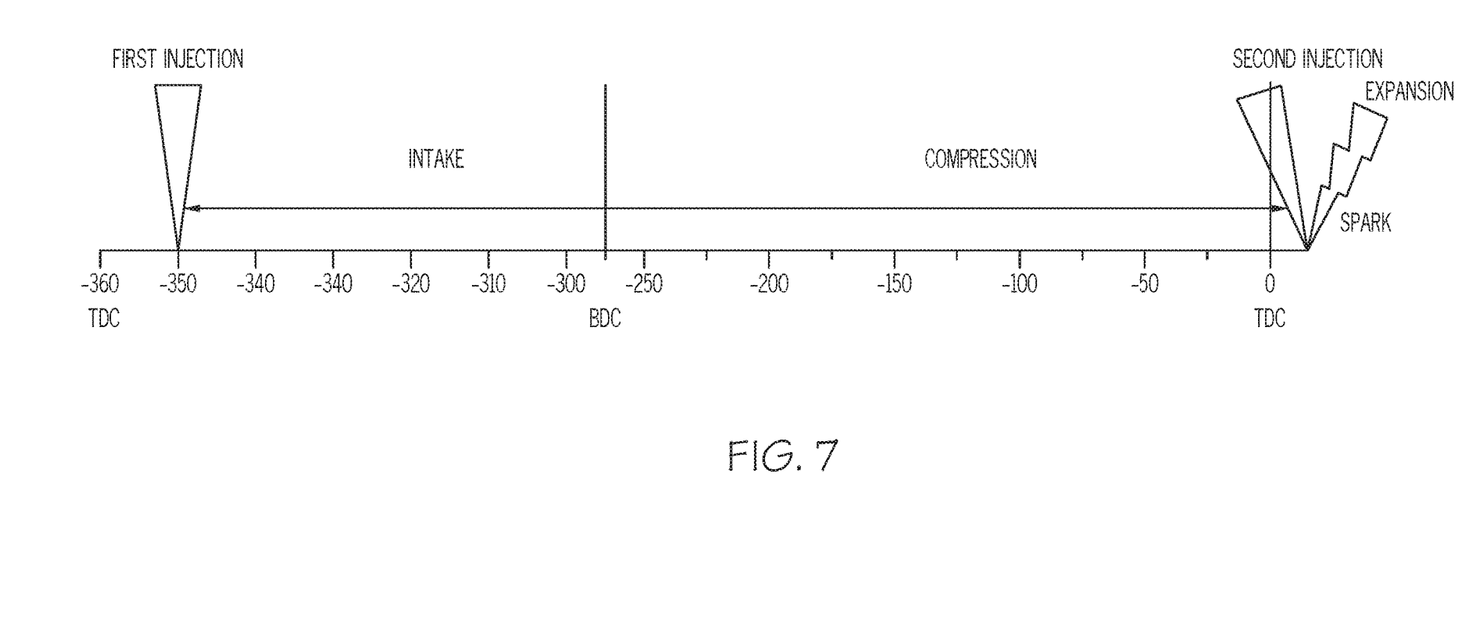
FIG. 7 schematically depicts an example timing chart for a method for operating the internal combustion engine system of FIG. 1, according to one or more embodiments described herein.

For example and referring to FIGS. 1, 6, and 7, an example timing chart for dispensing fuel 20 with the fuel injector 124 and initiating ignition of the fuel 20 with the ignition device 126 is depicted in relation to the rotational position of the crankshaft 116. In embodiments, the internal combustion engine system 100 operates with a split-injection and retarded spark strategy, for example during cold start fast idle conditions. In embodiments, the engine control unit 170 employs a combustion strategy in which the engine control unit 170 directs the fuel injector 124 to dispense an initial portion of fuel 20 into the combustion chamber 106 as the piston 112 moves downward in the intake stroke. For example in some embodiments, the engine control unit 170 directs the fuel injector 124 to dispense the first portion of fuel 20 when the crankshaft 116 is positioned at a rotational position between 5 degrees and 15 degrees after the top dead center rotational position during the intake stroke. In the embodiment depicted in FIG. 7, the engine control unit 170 directs the fuel injector 124 to dispense the first portion of fuel 20 when the crankshaft 116 is positioned at a rotational position that is about 10 degrees after the top dead center rotational position during the intake stroke (i.e., −350 degrees as depicted in FIG. 7).

The piston 112 then continues to move downward in the intake stroke until the piston 112 reaches bottom dead center, and then moves upward in the compression stroke until the piston 112 reaches top dead center again (i.e., 0 degrees as depicted in FIG. 7). After reaching top dead center, the piston 112 moves downward again in the expansion stroke. In embodiments, the engine control unit 170 directs the fuel injector 124 to dispense a second portion of fuel 20 into the combustion chamber 106 while the piston 112 moves downward in the expansion stroke or while the piston 112 moves downward in the intake stroke. In the embodiment depicted in FIG. 7, the engine control unit 170 directs the fuel injector 124 to dispense the second portion of fuel into the combustion chamber 106 while the piston 112 moves downward in the expansion stroke. For example, in embodiments, the engine control unit 170 directs the fuel injector 124 to dispense the second portion of fuel into the combustion chamber 106 when the crankshaft 116 is positioned at a rotational position between 10 degrees and 20 degrees after the top dead center rotational position during the expansion stroke. In the embodiment depicted in FIG. 7, the engine control unit 170 directs the fuel injector 124 to dispense the second portion of fuel 20 into the combustion chamber 106 when the crankshaft 116 is positioned at about 15 degrees after the top dead center rotational position during the expansion stroke.

The engine control unit 170 further directs the ignition device 126 to light off a spark when the piston 112 moves downward in the expansion stroke. For example, in some embodiments, the engine control unit 170 directs the ignition device 126 to light off the spark during the expansion stroke when the crankshaft 116 is positioned at a rotational position between 10 degrees and 25 degrees after the top dead center rotational position during the expansion stroke. In the embodiment depicted in FIG. 7, the engine control unit 170 directs the ignition device 126 to light off the spark when the crankshaft 116 is positioned at about 15 degrees after the top dead center rotational position during the expansion stroke.

In embodiments, the mass of the first portion of fuel 20 dispensed into the combustion chamber 106 is different than the mass of the second portion of fuel 20 dispensed into the combustion chamber 106. For example, in some embodiments, the first portion of fuel and the second portion of fuel together comprise a total amount of fuel, and the second portion of fuel comprises between 10% and 25% of the total amount of fuel by mass. In some embodiments, the first portion of fuel and the second portion of fuel together comprise a total amount of fuel, and the second portion of fuel comprises about 15% of the total amount of fuel by mass.

Figure 8A:
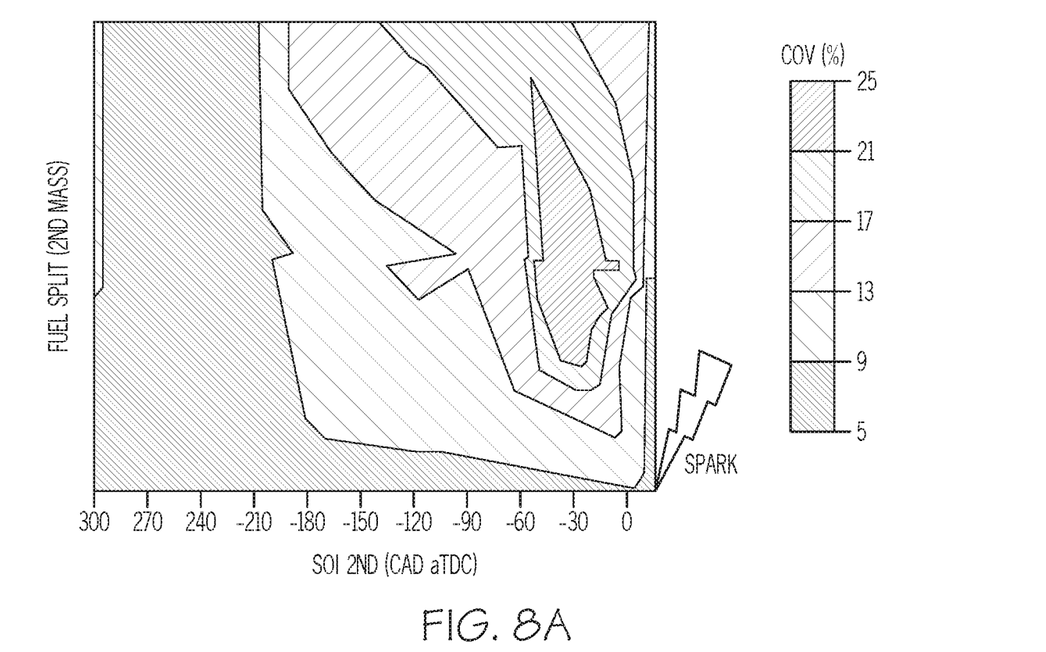
FIG. 8A schematically depicts a coefficient of variation (COV) of indicated mean effective pressure (IMEP) of different ignition and injection strategies of the internal combustion engine system of FIG. 1, according to one or more embodiments described herein.

By splitting the injection of fuel into the combustion chamber 106 between the first portion and the second portion and by retarding the spark timing, combustion stability may be increased. For example and referring to FIG. 8A, the coefficient of variation (COV) of indicated mean effective pressure (IMEP) is schematically depicted as a function of the mass of the second portion of fuel and the timing of the start of injection (SOI) of the second portion of fuel evaluated by the angle of the crankshaft 116 after top dead center (aTDC). As shown in FIG. 8A, the COV at different fuel mass splits is comparatively low when the SOI of the second portion of fuel is performed during the expansion stroke (i.e., about 15 degrees aTDC).

Figure 8B:
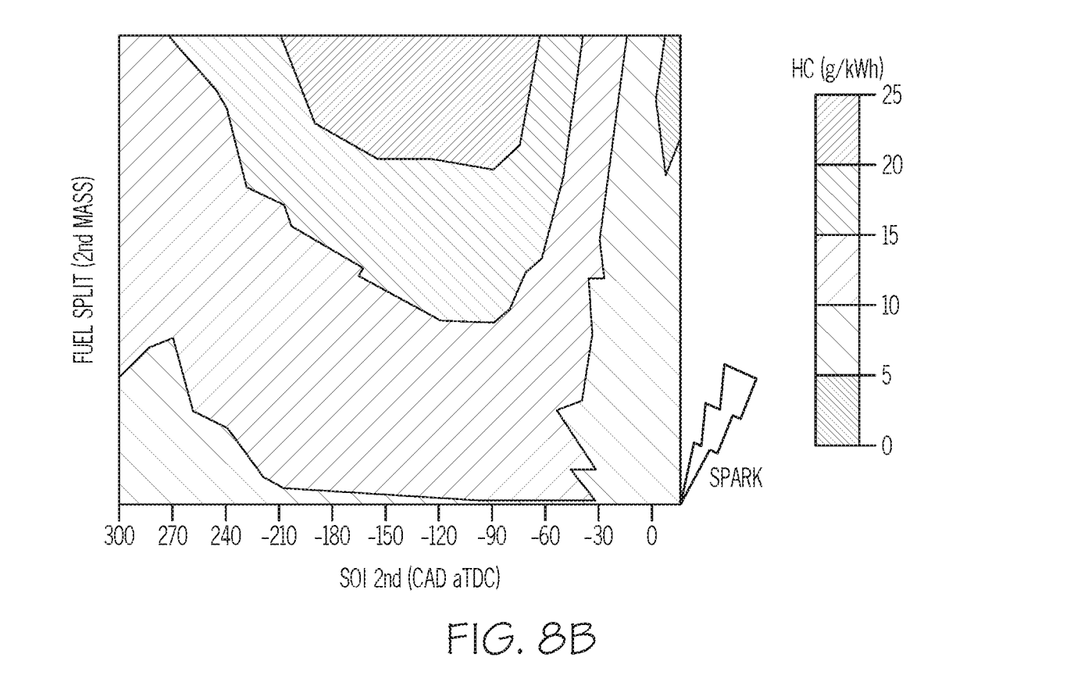
FIG. 8B schematically depicts hydrocarbon emissions of different ignition and injection strategies of the internal combustion engine system of FIG. 1, according to one or more embodiments described herein.

Moreover, the emission of hydrocarbons from the internal combustion engine system 100 may also be reduced as shown in FIG. 8B. In particular, FIG. 8B schematically depicts hydrocarbon emissions from the internal combustion system 100 in grams per kilowatt hour as a function of the mass of the second portion of fuel and the SOI of the second portion of fuel evaluated by the angle of the crankshaft 116 aTDC. As shown in FIG. 8B, the amount of hydrocarbons emitted at different fuel mass splits is comparatively low when the SOI of the second portion of fuel is performed during the expansion stroke (i.e., about 15 degrees aTDC).

Without being bound by theory, the reduction in the hydrocarbon emissions is influenced by the light off of the catalyst 130 (FIG. 1). By retarding spark timing into the expansion stroke and timing the SOI of the second portion of fuel in the expansion stroke, the temperature and the thermal enthalpy of the exhaust gases from the combustion chamber 106 (FIG. 1) may be increased, allowing the catalyst 130 to light off more quickly, thereby reducing hydrocarbon emissions. In particular and without being bound by theory, retardation of spark timing generally increases the temperature and the thermal enthalpy of exhaust gases from the combustion chamber 106 (FIG. 1).

Figure 9:
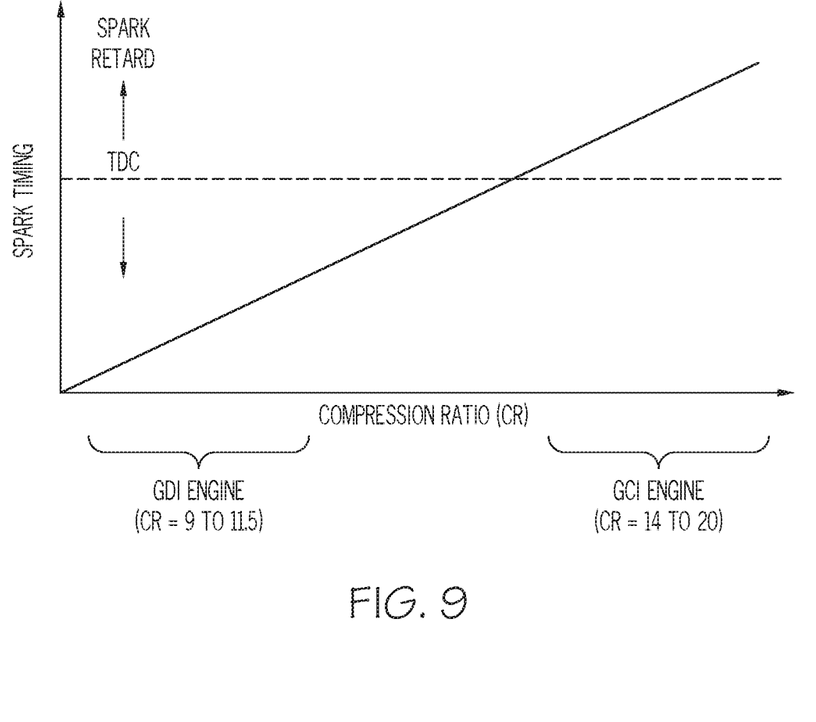
FIG. 9 schematically depicts a chart showing spark timings to achieve similar exhaust temperature and exhaust thermal enthalpy in engines with different compression ratios, according to one or more embodiments described herein.

However, spark timing may need to be significantly retarded to increase the temperature and the thermal enthalpy of exhaust gases in engines including high compression ratios (e.g., compression ignition engines). For example and referring to FIG. 9 a chart showing spark timings to achieve similar exhaust temperature and exhaust thermal enthalpy in engines with different compression ratios is schematically depicted. To achieve similar increased exhaust temperature and exhaust thermal enthalpy as gasoline direct injection (GDI) engines having comparatively low compression ratios, spark timing for gasoline compression ignition (GCI) engines with comparatively high compression ratios may be retarded after TDC (i.e., spark during the expansion stroke).

As noted above, the catalyst 130 (FIG. 1) defines a light-off temperature that corresponds to a minimum temperature at which a desired amount of pollutants (e.g., carbon monoxide and/or hydrocarbons) are converted. In embodiments, as the exhaust gas travels through the engine exhaust 123 (FIG. 1) to the catalyst 130 (FIG. 1), heat is dissipated. Furthermore in embodiments in which the internal combustion system 100 includes the turbocharger 132 in communication with the engine exhaust 123, the enthalpy of the exhaust gases may be further reduced by the time the exhaust gases reach the catalyst 130.

By retarding the spark timing into the expansion stroke and timing the SOI of the second portion of fuel in the expansion stroke, the temperature of the exhaust gases may be sufficient to light off the catalyst 130 (FIG. 1) to reduce hydrocarbon emissions during cold start fast idle conditions. For example in some embodiments, the temperature of exhaust gases may be between 700 degrees Celsius and 800 degrees Celsius, inclusive of the endpoints.

In some embodiments, additional spark and injection strategies may be employed in a cold start condition. For example in some embodiments, the split injection and retarded spark ignition strategy described above and depicted in FIG. 7 is a tertiary combustion strategy, and an initial combustion strategy and/or a secondary combustion strategy may be performed prior to the tertiary combustion strategy. For example and referring again to FIG. 1, in some embodiments, an initial combustion strategy includes dispensing an initial portion of fuel into the combustion chamber 106 during the expansion stroke, and igniting the initial portion of fuel (e.g., via the ignition device 126) during the expansion stroke. In some embodiments, initial portion of fuel is dispensed and ignited while the crankshaft is positioned between 20 degrees and 60 degrees after top dead center during the expansion stroke. In some embodiments, the initial portion of fuel is split between a first initial portion of fuel and a second initial portion of fuel that are both dispensed during the expansion stroke. A throttle valve (not depicted) may be in selective communication with the combustion chamber and may be in a wide open position during the initial combustion strategy. This initial combustion strategy may be performed for a comparatively short duration (e.g., a few cycles).

In some embodiments, subsequent to performing the initial combustion strategy and prior to performing the tertiary combustion strategy, a secondary combustion strategy is performed. The secondary combustion strategy generally transitions the spark and injection timing to the tertiary combustion strategy outlined above and depicted in FIG. 7. The secondary combustion strategy generally includes dispensing a secondary portion of fuel into the combustion chamber 106 during the compression stroke and igniting the secondary portion of fuel (e.g., via the ignition device 126) during the compression stroke. The spark timing and the injection timing during the secondary combustion strategy may be transient, gradually advancing the spark timing and injection timing until the internal combustion engine system 100 is performing the tertiary combustion strategy. The secondary combustion strategy may generally assist in avoiding misfires and enabling rapid warm-up of the internal combustion engine 101.

Accordingly, it should now be understood that embodiments described herein are directed to internal combustion engine systems and methods for operating internal combustion engine systems with ignition and spark timing strategies to reduce undesirable emissions and increase combustion stability. In embodiments described herein, a first portion of fuel is dispensed to a combustion chamber in the intake stroke, and a second portion of fuel is dispensed to the combustion chamber in the expansion stroke. During the expansion stroke, an ignition device such as a spark plug lights off a spark to assist igniting the first and second portions of fuel. The split fuel injection and the retarded spark timing generally increases the temperature of exhaust gases from the combustion chamber, which may reduce undesirable emissions by lighting off a catalyst in communication with the combustion chamber. Moreover, the split fuel injection strategy forms a stratified fuel mixture and generally assists in increasing combustion stability in cold start fast idle conditions.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modifications and variations come within the scope of the appended claims and their equivalents.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method for operating an internal combustion engine, wherein:
    the internal combustion engine comprises a pent roof combustion chamber defining a compression ratio between 14 and 20;
    the pent roof combustion chamber comprises a pent roof defining an angled surface, an ignition device, and a hollow cone fuel injector positioned on the angled surface of the pent roof;
    the hollow cone fuel injector is configured to dispense fuel in a split plume;
    the ignition device is positioned between split plumes of fuel from the hollow cone fuel injector;
    the ignition device is spaced apart from the hollow cone fuel injector by a distance $d_1$ between 15 millimeters and 20 millimeters;
    the ignition device is positioned at an ignition device angle β between 0 degrees and 22 degrees with respect to the hollow cone fuel injector, above the split plumes of fuel from the hollow cone fuel injector;
    the method comprises operating the internal combustion engine in a spark ignition mode under cold start fast idle conditions before operating the internal combustion engine in a compression ignition mode in which an air/fuel mixture combusts in the pent roof combustion chamber as a result of compression of the air/fuel mixture;
    the spark ignition mode comprises:
        moving a piston downward in a vertical direction from a top dead center position to a bottom dead center position expanding the pent roof combustion chamber thereby drawing air into the pent roof combustion chamber in an intake stroke, wherein the pent roof combustion chamber is defined at least in part by the piston, a sidewall, and a cylinder head comprising the pent roof;
        dispensing a first portion of fuel in a split plume into the pent roof combustion chamber using the hollow cone fuel injector while moving the piston downward in the intake stroke;
        subsequent to moving the piston downward in the intake stroke, moving the piston upward in the vertical direction compressing the pent roof combustion chamber in a compression stroke;
        subsequent to moving the piston upward in the compression stroke, moving the piston downward in the vertical direction in an expansion stroke;
        while moving the piston downward in the vertical direction in the expansion stroke, dispensing a second portion of fuel in a split plume into the pent roof combustion chamber using the hollow cone fuel injector, to form a stratified fuel mixture in the pent roof combustion chamber, the stratified fuel mixture comprising the first portion of fuel and the second portion of fuel; and
        while moving the piston downward in the expansion stroke, igniting the stratified fuel mixture from above and between the split plumes of fuel within the pent roof combustion chamber using the ignition device;
    the spark ignition mode is a tertiary combustion strategy and the method comprises operating the internal combustion engine in an initial combustion strategy, and subsequently in a secondary combustion strategy, both prior to the tertiary combustion strategy;
    the initial combustion strategy comprises:
        moving the piston downward in the vertical direction from the top dead center position to the bottom dead center position expanding the pent roof combustion chamber in the expansion stroke;
        rotating a crankshaft coupled to the piston;
        dispensing an initial portion of fuel into the pent roof combustion chamber in a split plume using the hollow cone fuel injector while moving the piston downward in the expansion stroke; and
        igniting the initial portion of fuel within the pent roof combustion chamber using the ignition device while the crankshaft is positioned between 20 degrees and 60 degrees after top dead center and while moving the piston downward in the expansion stroke;
    the secondary combustion strategy is performed subsequent to the initial combustion strategy and prior to the tertiary combustion strategy to transition the spark and injection timing of the initial combustion strategy to the tertiary combustion strategy and comprises:
        while moving the piston upward in the vertical direction in the compression stroke, dispensing the second portion of fuel into the pent roof combustion chamber in a split plume using the hollow cone fuel injector; and
        igniting at least a part of the second portion of fuel within the pent roof combustion chamber using the ignition device, wherein spark timing of the ignition device and injection timing of the hollow cone fuel injector during the secondary combustion strategy is transient and advances the spark timing and the injection timing until the internal combustion engine is performing the tertiary combustion strategy.

2. The method of claim 1, wherein dispensing a secondary third portion of fuel into the pent roof combustion chamber comprises dispensing the secondary third portion of fuel into the pent roof combustion chamber during the intake stroke.

3. The method of claim 1, wherein dispensing a secondary third portion of fuel into the pent roof combustion chamber comprises dispensing the secondary third portion of fuel into the pent roof combustion chamber during the expansion stroke.

4. The method of claim 1, wherein igniting the at least a part of the second portion of fuel within the pent roof combustion chamber comprises igniting the second portion of fuel during the compression stroke.

\* \* \* \* \*